INVENTOR.
RICHARD R. MILLER
BY
H. G. Manning
ATTORNEY

United States Patent Office 2,936,451
Patented May 10, 1960

2,936,451

RADAR INTERFERENCE SUPPRESSOR WHICH CANCELS NOISE SIGNALS ABOVE ADJUSTABLE LEVEL

Richard R. Miller, Lakeville, Conn.

Application July 26, 1957, Serial No. 674,489

1 Claim. (Cl. 343—17.1)

My invention relates to electronic pulse-echo search apparatus, commonly called "radar," and is directed particularly to an electrical device for improving the signal presentation in such an apparatus.

It is well known that pulse-echo, or "radar" systems are provided with a transmitter, a receiver, and an indicating or presentation unit. The transmitter sends out accurately timed, high-power, high-frequency radio impulses of short duration, which, echoing back from outlying objects, are received in a measurable time relationship to the originally transmitted pulse. It is also well known that the echo signal is in general very weak in comparison with the power of the originally transmitted pulse signal. The receiver of the pulse-echo system must therefore be of extraordinarily high gain to magnify the echo signal sufficiently to produce a perceptible deflection of the electron stream in a cathode ray tube, the visual presentation device commonly used in the pulse-echo indicator unit.

While the selectivity of the receiver or radar system is great, still it is found that systems of proximate frequencies, by their sheer power, interfere with each other's presentation of pertinent echo signals. This interference shows up on the conventional plan position indicator as a series of white spots, sometimes aligned, sometimes spiraling, and is irritating to the operator as well as destructive of the purposes of the radar apparatus. From a search point of view, such interference is useless, except that on occasion it may reveal the presence of a radar of proximate frequency at some undefined distance from the searching radar.

It is the principal object of the present invention greatly to reduce interference of the kind described above.

A more particular object of my invention is to utilize the signal pulses transmitted by outlying radar systems which cause the interference described above in such a way as to cancel themselves out in the echo presentation or display device of the instant radar system, thus eliminating such signals as a source of interference with respect to the true echo signals or images.

Another object of my invention is to provide a radar interference suppressor of the above nature which is simple in construction, easy to apply to existing radar systems, inexpensive to manufacture and maintain, and effective and dependable in operation.

Figure 1:
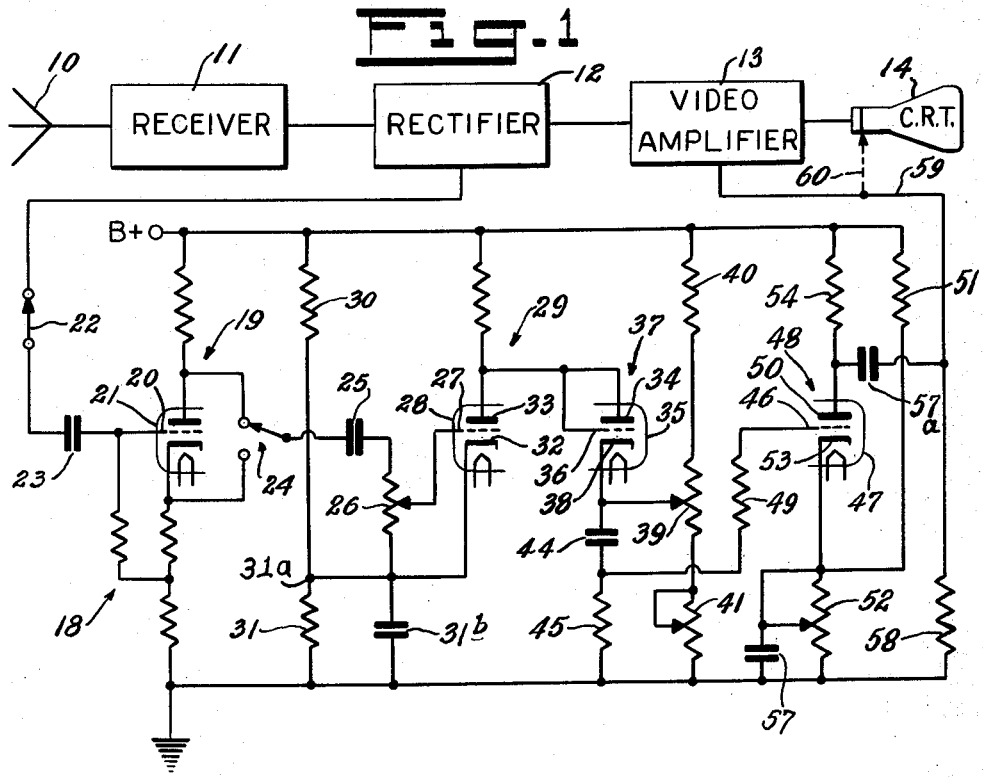
Figure 2:
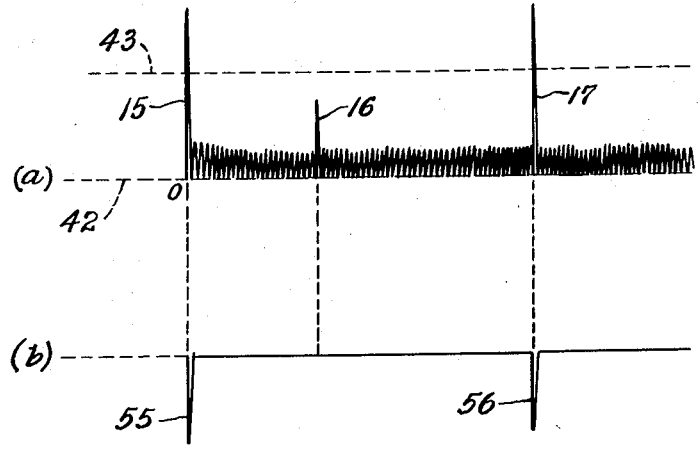

Other objects, features and advantages of my invention will be apparent from the following description when read with reference to the accompanying drawings wherein:

Fig. 1 is a schematic diagram of an electronic radar interference suppressor device embodying my invention shown in its functional relation to a radar system, the principal component parts of the receiver and indicator of which are shown in block diagram, and Fig. 2 illustrates graphically the method of operation of the radar interference suppressor device in cancelling unwanted interference signals in the radar presentation unit.

Referring now in detail to the drawing, Fig. 1 shows in block diagram the receiving branch of a typical radar system comprising an antenna 10, a radio frequency receiver and amplifier 11, a rectifier 12, a video amplifier 13, and a visual presentation device such as a cathode ray tube 14.

Fig. 2(a) shows one sweep of a video signal as it is customarily presented in "A-scope" type presentation, in which the high amplitude impulse 15 is the main "bang" or transmitted impulse of the radar system while the low amplitude impulse 16 is a typical echo signal of said system; and in which the high amplitude impulse 17 represents a spurious signal produced by direct transmission of an impulse from another radar system.

The radar interference suppressor comprising the present invention, shown in electrical schematic diagram in Fig. 1 and indicated generally by the reference numeral 18, comprises a conventional phase splitter 19, into the grid 20 of a triode 21 of which, the received signals are fed through a switch 22 and a capacitor 23.

The output of the phase splitter 19 is fed through a polarity-selector switch 24, a coupling condenser 25, and a potentiometer 26, to the grid 27 of a triode 28 comprising an amplifying stage 29. In the position of the selector switch 24 shown, the signals are applied to the grid 27 of the triode 28 in negative polarity, the potentiometer 26 being employed for the purpose of controlling the amplitude of said signals. A pair of resistors 30 and 31, connected in series between B+ and the ground are connected at their juncture 31a to a cathode 32 of the triode 28, and to the low impedance end of the potentiometer 26, whereby the cathode 32 and the grid 27 of said triode are kept well above ground potential.

A capacitor 31b, connected across the power-bias resistor 31, insures a constant voltage on the cathode 30, thereby preventing signal degeneration. The absence of any bias voltage in the triode 28 serves as a means of maintaining the D.C. restoration of the amplified and positive polarity video signals appearing at the plate 33 of said triode.

The anode 33 of the triode tube 28 is coupled to the anode and grid 34 and 36 of a triode 35, which operates as a diode stage 37. The cathode 38 of the triode 35 is connected to the contact arm of a potentiometer 39 which is connected in series between a fixed resistor 40 and a variable resistor 41. The resistors 40 and 41 and the potentiometer 39 constitute a voltage divider for applying a variable but limited potential between B+ and ground to the cathode 38.

The triode 35 connected as a diode will thus be able to conduct only in the presence of a voltage amplitude at its plate 34 greater than that established at its cathode 38 by the potentiometer 39.

Referring now to Fig. 2(a), the dotted line abscissa 42 represents the zero signal voltage reference line, and the upper dotted line 43 represents a positive voltage level with respect to said abscissa. In the present invention, the potentiometer 39 serves as a means for maintaining the cathode 38 of the diode connected triode 35 at a suitable level, represented by the upper dotted line 43 in Fig. 2, for conducting in the presence of signals of abnormal amplitude, such as the main "bang" impulse 15, or the high amplitude impulse 17 produced by direct transmission of an unwanted impulse from another radar system, or a cumulative noise peak, but not conducting in the presence of signals of normal echo amplitude.

A capacitor 44 in the cathode circuit of the diode stage 37, charging in the presence of a pulse produced by the conduction of the diode-connected triode 37, is the means of producing a positive voltage across a resistor 45, in series with said cathode circuit. This voltage is impressed on a grid 46 of a triode 47 comprising an output stage 48 through a current limiting resistor 49. The variable resistor 41 allows voltage adjustment to permit setting of the potentiometer 39 at a voltage level not enough to reach into the area of normal echo signals, but low enough to pick off the above-mentioned pulses 15 and 17 of excess amplitude, which latter pulses, appearing at positive polarity at the grid of the triode 47, produce greatly amplified signals of negative polarity at the plate 50 of said triode.

A resistor 51 and a variable resistor 52, connected in series between B+ and ground, provide adjustable power-bias means applied to the cathode 53 of the triode 47 for maintaining negative D.C. restoration of the signal appearing across the output resistor 54 of said triode. These signals are shown in Fig. 2(b) by an impulse 55, derived from the impulse 15 in Fig. 2(a), and an impulse 56, derived from the impulse 17 in Fig. 2(a).

A capacitor 57 connected across the variable resistor 52 in the cathode circuit of the output stage 48 serves to maintain the cathode 53 at a constant bias voltage, thereby preventing degeneration of the signals. The variable resistor 52 is set to maintain the bias most suitable for the requirements of the D.C. amplifying triode 47.

The output signals appearing across the output resistor 54 are fed through a capacitor 57a to an output resistor 58 connected to ground, and through conductor 59, to the video amplifier 13 of the radar system with which the interference suppressor is associated, where they will be applied in opposing polarity to substantially cancel out the original interference impulses 15, 17 (Fig. 2a) from which they were derived. It may also be desirable in certain installations to connect the output of the interference suppressor 18 directly to the grid circuit of the presentation cathode ray tube 14, as indicated by a dotted line connection 60 leading thereto. It will be clear to anyone skilled in the art that suitable adjustments of the kind suggested must be made to meet transit time factors.

It will be understood that the polarity selector switch 24 in the output of phase splitter stage 19 provides for adaptation of the polarity of the input signal to the purposes of subsequent circuitry. The switch 22 in series with the input circuit to the phase splitter stage 19 permits switching out of the suppressor device when not needed.

One advantage of the interference suppressor device hereinabove described is that it provides a simple and effective means for eliminating interference occasioned by unwanted and spurious signal impulses of abnormal amplitude in radar indicator display systems.

Another advantage is that the device can readily be applied equally well to a wide variety of radar systems.

Although, for the sake of clarity and simplicity, only one form in which the invention may be embodied in practice is described in this specification, it is to be understood that this form is given by way of illustration only, and that the invention is not limited to the particular disclosure, but may be modified and embodied in various other equivalent forms without departing from its spirit. In short, the invention includes all the modifications and embodiments coming within the scope of the following claim.

Having thus fully described the invention, what is claimed as new and for which it is desired to obtain Letters Patent is:

In a radar interference signal suppressor for use with a conventional radar system including a transmitter, a receiver, and an indicator unit, the combination comprising electronic means to control the polarity and amplitude of the radar echo signals detected in the rectifier stage of the receiver of said radar system, amplitude-gate means for selecting signals in excess of limited parameters of signal amplitude, said amplitude gate comprising a diode so biased as to conduct only in the presence of signals well in excess of the amplitude of the normal echo signals, means for applying said selected signals of excessive amplitude to the video amplifier circuitry in such time relationship and of such phase and amplitude as to cancel the interference signals of excessive amplitude, and means preceding said amplitude-gate means for selectively determining the polarity of said radar signals.

References Cited in the file of this patent

UNITED STATES PATENTS

| | | |
|---|---|---|
| 1,705,993 | Ostwald | Mar. 19, 1929 |
| 2,589,711 | Lacy | Mar. 18, 1952 |
| 2,626,349 | Page | Jan. 20, 1953 |
| 2,692,333 | Holmes | Oct. 19, 1954 |
| 2,841,646 | Thomas | July 1, 1956 |